United States Patent
M M et al.

(10) Patent No.: US 11,838,854 B2
(45) Date of Patent: Dec. 5, 2023

(54) 5G NETWORK SLICING AND RESOURCE ORCHESTRATION USING HOLOCHAIN

(71) Applicant: Cisco Technology, Inc., San Jose, CA (US)

(72) Inventors: Niranjan M M, Bengaluru (IN); Nagaraj Kenchaiah, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 65 days.

(21) Appl. No.: 17/367,710

(22) Filed: Jul. 6, 2021

(65) Prior Publication Data
US 2023/0008892 A1    Jan. 12, 2023

(51) Int. Cl.
*H04W 48/08* (2009.01)
*H04W 48/16* (2009.01)

(52) U.S. Cl.
CPC ........... *H04W 48/08* (2013.01); *H04W 48/16* (2013.01)

(58) Field of Classification Search
CPC ............................... H04W 76/11; H04L 29/08
USPC ........................................................ 455/434
See application file for complete search history.

(56) References Cited

U.S. PATENT DOCUMENTS

| | | | |
|---|---|---|---|
| 10,949,557 B2 | 3/2021 | Patil et al. | |
| 2019/0057362 A1* | 2/2019 | Wright | H04L 9/0861 |
| 2019/0380030 A1 | 12/2019 | Suthar et al. | |
| 2020/0029250 A1* | 1/2020 | Ibek | H04W 28/26 |
| 2020/0195495 A1 | 6/2020 | Parker et al. | |
| 2020/0349194 A1* | 11/2020 | Kundu | G06F 16/903 |
| 2020/0404480 A1* | 12/2020 | Zhu | H04W 48/12 |
| 2021/0021981 A1* | 1/2021 | Lauster | H04W 36/14 |
| 2021/0073913 A1* | 3/2021 | Ingargiola | G06Q 20/02 |

OTHER PUBLICATIONS

Backman, et al., "Blockchain Network Slice Broker in 5G: Slice Leasing in Factory of the Future Use Case", 2017 Internet of Things Business Models, Users, and Networks, Nov. 2007, IEEE, Copenhagen, Denmark.

Maksymyuk, et al., "Blockchain-Based Networking Functions Virtualization for 5G Network Slicing", Acta Electrotechnica et Informatica, vol. 20, No. 4, Dec. 2020, pp. 54-59, Technical University of Kosice (TUKE), Slovakia.

(Continued)

*Primary Examiner* — Fabricio R Murillo Garcia
(74) *Attorney, Agent, or Firm* — BEHMKE INNOVATION GROUP LLC; Kenneth J. Heywood; James J. Wong

(57) ABSTRACT

In one embodiment, a first entity of a 5G network identifies an action that the first entity would like performed in the 5G network. The first entity of the 5G network sends a signed Holochain transaction indicative of the action to a second entity of the 5G network. The second entity of the 5G network generates a mutually-signed Holochain transaction by signing the signed Holochain transaction. The first entity of the 5G network receives the mutually-signed Holochain transaction from the second entity of the 5G network. The first entity of the 5G network publishes the mutually-signed Holochain transaction to a distributed hash table.

20 Claims, 8 Drawing Sheets

(56) References Cited

OTHER PUBLICATIONS

Rawat, et al., "Leveraging Distributed Blockchain-based Scheme for Wireless Network Virtualization with Security and QOS Constraints", 2018 International Conference on Computing, Networking and Communications (ICNC): Communications and Information Security Symposium, Mar. 2018, pp. 332-336, IEEE, Maui, Hawaii.

Brock, et al., "Holo Green Paper", online: https://files.holo.host/2017/12/Holo-Green-Paper.pdf, Dec. 2017, accessed Apr. 13, 2021, 38 pages, holochain.org.

Harris-Braun, et al., "Holochain: Scalable Agent-Centric Distributed Computing", online: http://ceptr.org/whitepaper_holochain.pdf, Oct. 2017, 13 pages, ceptr.org.

Kenchaiah, el al., "Distributed Policy Management for Service Provider Chains", Technical Disclosure Commons, Defensive Publications Series, May 13, 2020, 8 pages, tdcommons.org.

"FAQ—The Holochain Guidebook", online: https://holochain.github.io/holochain-rust/faq.html, accessed Jun. 2, 2021, 8 pages.

Giulia, "Holochain vs Blockchain", online: blog.lctechnologybank.com/2020/04/25/holochain-vs-blockchain/, Apr. 25, 2020, 6 pages.

"5G", online: https://en.wikipedia.org/wiki/5G, Jun. 1, 2021, 20 pages, Wikimedia Foundation, Inc.

\* cited by examiner

5G NETWORK SLICING AND RESOURCE ORCHESTRATION USING HOLOCHAIN

TECHNICAL FIELD

The present disclosure relates generally to computer networks, and, more particularly, to 5G network slicing and resource orchestration using Holochain.

BACKGROUND

The fifth generation of cellular networks, also known as 5G, presents an evolution over previous generations, promising broadband connectivity to potentially billions of endpoints in the future. In support of this increased data rate, lower latency, etc., the concept of network slicing has also emerged. Generally speaking, network slicing leverages network function virtualization and software defined network techniques, to divide the resources (e.g., connectivity, computing, and storage) into multiple logical network layers. This slows different applications to be served in parallel, with each application receiving its own suitable layer. Overall, network slicing enables the sharing of resources among multiple tenants, network operators, and/or services in multi-domain deployments.

Typically, a user equipment (UE) device requests one or more network slices when registering with an access and mobility management function (AMF)/mobility management entity (MME), which creates or provides the details of the slice(s), accordingly. This requires that the UE device maintain details about the service and slice requirements (e.g., in terms of bandwidth, latency, processing, resiliency, etc.), so that it can send its request for a slice. In addition, the receiving AMF/MME does not have any knowledge about the history of utilization in each slice requested by the UE device, so it cannot perform capacity planning (e.g., by using an existing slice vs. creating a new one). Further, an enterprise may subscribe to a software-as-a-service (SaaS) provider and access it across any number of network slices and service providers, but without any mechanism to associate those slices with the SaaS provider across the different service providers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
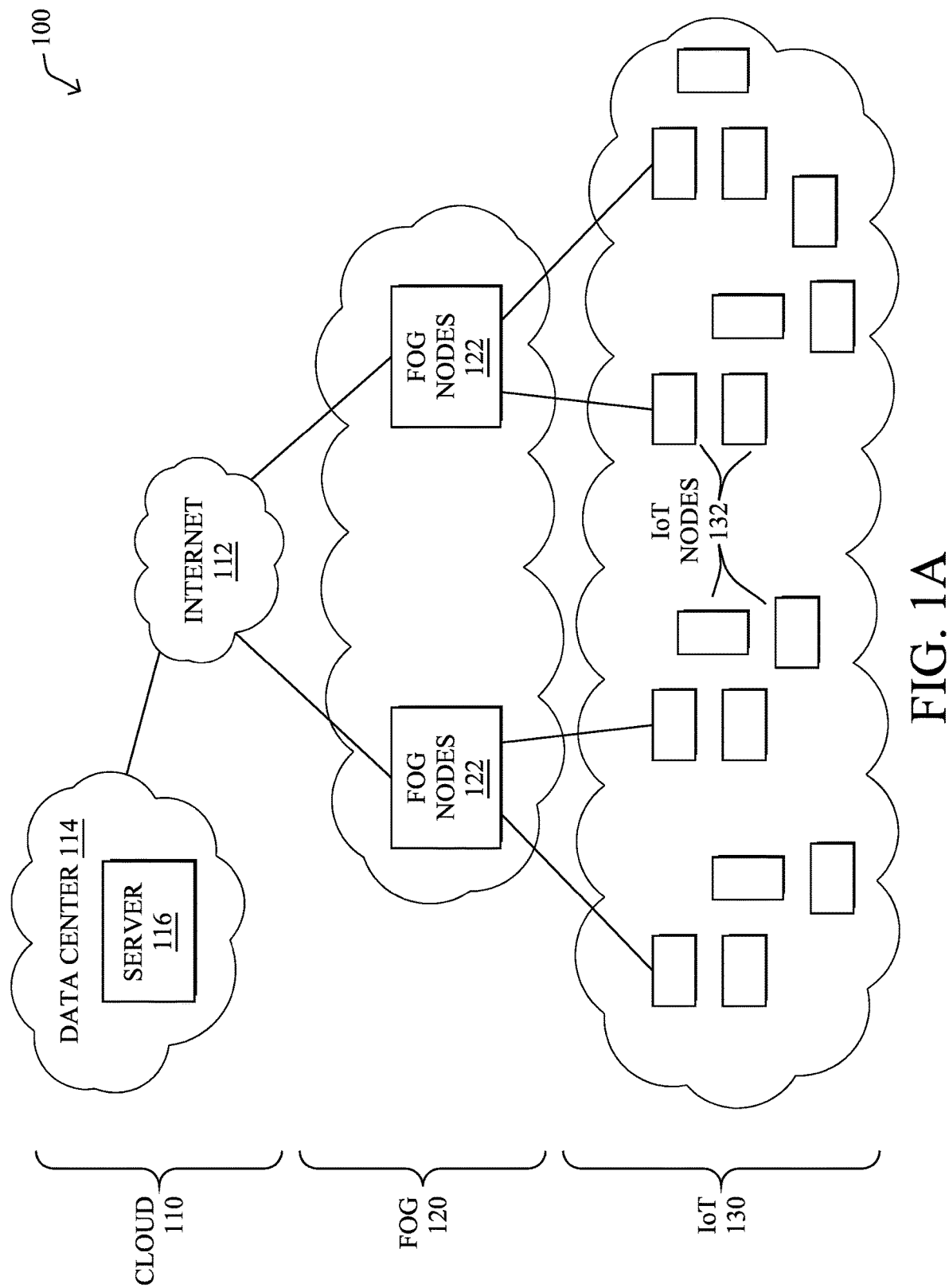
FIGS. 1A-1B illustrate an example communication network.

According to one or more embodiments of the disclosure, a first entity of a 5G network identifies an action that the first entity would like performed in the 5G network. The first entity of the 5G network sends a signed Holochain transaction indicative of the action to a second entity of the 5G network. The second entity of the 5G network generates a mutually-signed Holochain transaction by signing the signed Holochain transaction. The first entity of the 5G network receives the mutually-signed Holochain transaction from the second entity of the 5G network. The first entity of the 5G network publishes the mutually-signed Holochain transaction to a distributed hash table.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud layer 110, fog layer 120, and IoT device layer 130. Illustratively, the cloud layer 110 may comprise general connectivity via the Internet 112, and may contain one or more data centers 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
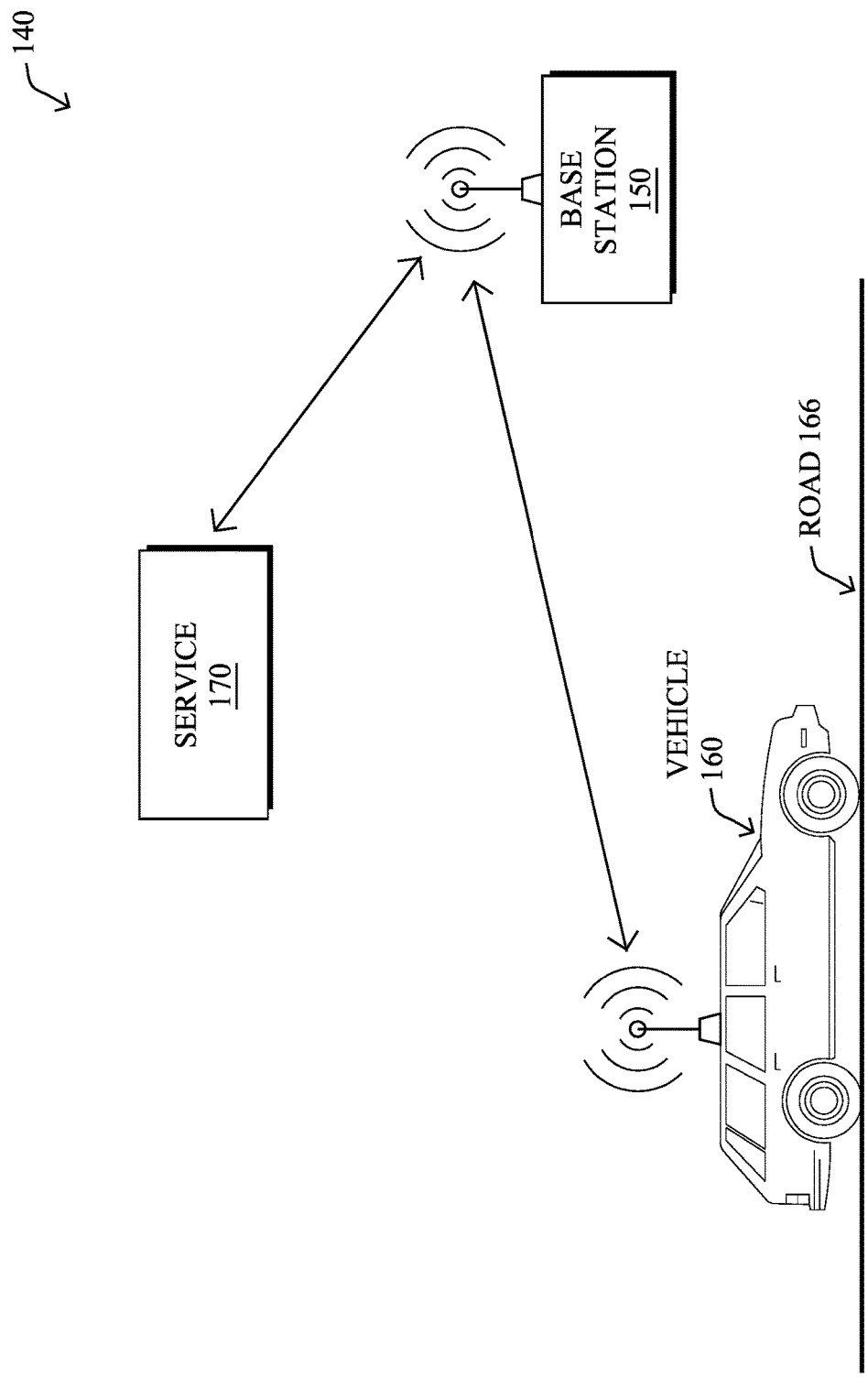

FIG. 1B illustrates an example communication system 140, according to various embodiments. In particular, communication system 140 may include any or all of the following components: a wireless node 160, a cellular base station 150, and/or a remote service 170. Generally, wireless node 160 may be any form of a portable electronic device, a fixed electronic device (e.g., a router, gateway, etc.), an IoT device, a vehicle, or any other form of device capable of communicating via a cellular network.

In some embodiments, communication system 140 may be a specific implementation of communication network 100. Notably, service 170 may be implemented at the cloud layer 110, such as at a particular server 116 in a data center 114 or, alternatively, across multiple servers 116, such as part of a cloud-based service. Similarly, base station 150 may be a fog node/device 122 at fog computing layer 120, while wireless node 160 may be viewed as an IoT node 132 at IoT layer 130. Thus, wireless node 160 may communicate directly with base station 150, and/or via other IoT nodes 132 (e.g., other vehicles, etc.), and base station 150 may provide some degree of processing over the communicated data.

Base station 150 may communicate with service 170 via a WAN, such as the Internet 112 or another WAN. For example, base station 150 may communicate with service 170 by leveraging a hardwired network connection, cellular or other wireless connection, satellite connection, or the like.

Figure 2:
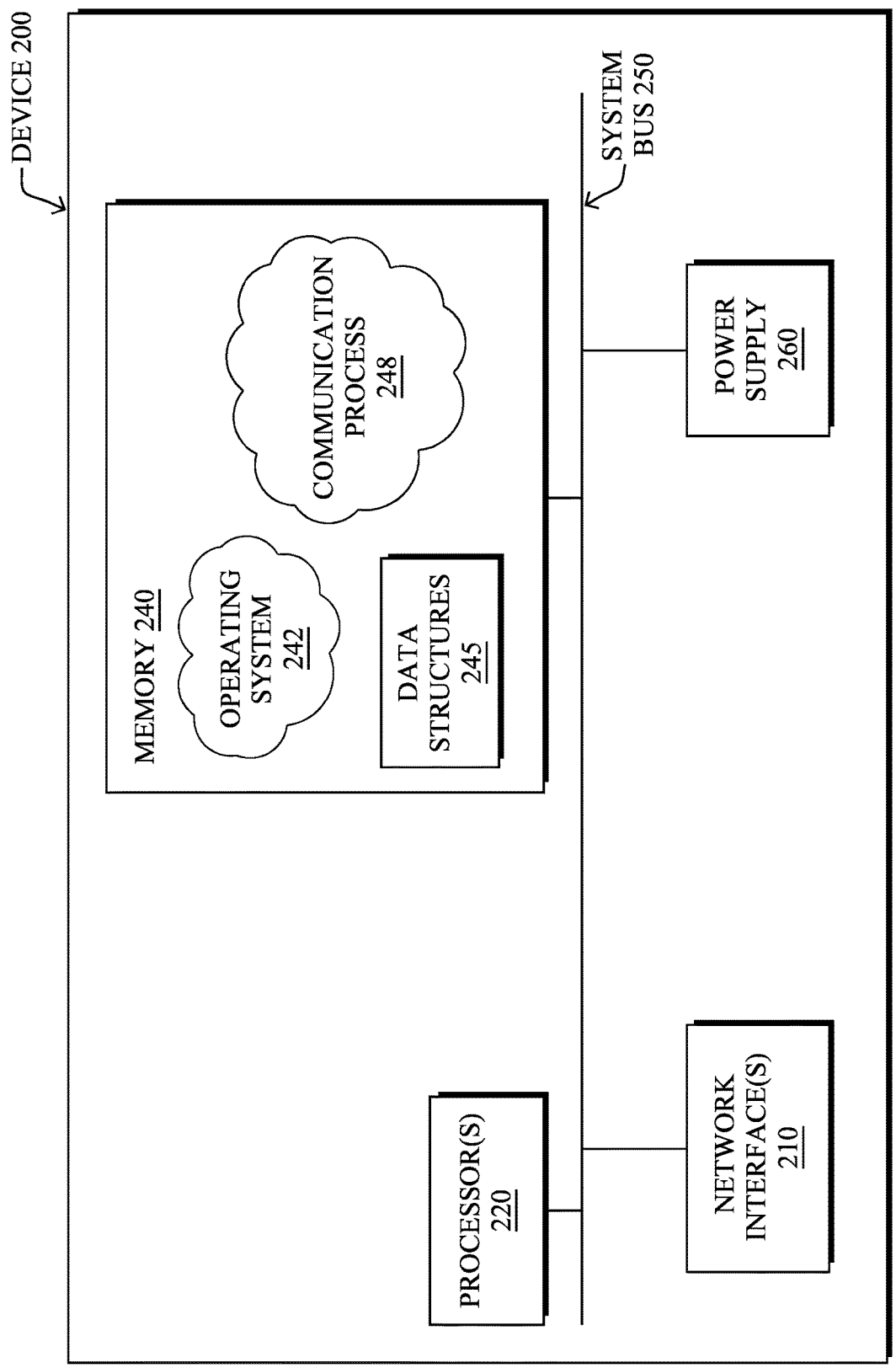
FIG. 2 illustrates an example network device/node.

FIG. 2 is a schematic block diagram of an example node/device 200 (e.g., an apparatus, controller, etc.) that may be used with one or more embodiments described herein, e.g., as any of the nodes or devices shown in FIGS. 1A-1B above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative communication process 248, as described herein. Note that while communication process 248 is shown in centralized memory 240 alternative embodiments provide for the process to be specifically operated within the network interface(s) 210.

It will be apparent to those skilled in the art that other processor and memory types, including various computer-readable media, may be used to store and execute program instructions pertaining to the techniques described herein.

Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, as detailed further below, communication process 248 may leverage Holochain to perform its functions. Generally speaking, Holochain emerged as a technology to address the shortfalls of blockchains and represents a separate and distinct technology, to address different use cases in which using blockchain is not practical. More specifically, blockchain operates by constructing transaction blocks, with each block having a unique hash to identify the transactions. These blocks are then published to a public ledger and are accessible by every participant with access to the network. Any attempt to alter a transaction will result in a different hash, allowing for the detection of the attempted change. Another feature of blockchain is that transactions also require global consensus, to verify and authenticate a given transaction.

Holochain operates quite differently from that of blockchain in that its data sharing and access are fully distributed, affording significantly improved scalability over that of blockchain. Indeed, rather than attempting to achieve global consensus for each change in a global ledger, each participant in a Holochain maintains their own signed hash chain. This allows for a peer-to-peer approach to be taken with respect to tractions and essentially serves as a private fork. Thus, when two peers sign a transaction, it can then be written to a distributed hash table (DHT) for storage. Effectively, this means that Holochain does not use centralized servers, ledgers, intermediaries/miners, etc., in sharp contrast to blockchain. In addition, Holochain provides holographic storage, as splitting a Holochain network in two will still result in two functioning systems, unlike in blockchain.

To achieve the above, Holochain uses the following:
1. Hash-chains: These provide data integrity that cannot be changed and maintain an order of transactions based on the time sequence on each node.
2. Digital Signature (Signing of chain cryptography): This is used for purposes of signing of messages and validation confirmation, to provide authorship, origin and accountability. Any re-signing of transactions/interactions between many parties will lead to a rejection and "locking" of chains.
3. Distributed Hash Table (DHT): This utilizes cryptographic hashes for content-addressable storage and validates with Hash-chains and Digital Signature before storing transactions on DHT.

In short, Holochain addresses the following drawbacks/limitations of blockchain:
Scalability, as data in blockchain needs to be replicated on all blockchain nodes and is also limited by the number of transactions.
Convergence time in blockchain is greater.
The overhead of adding transactions to the blockchain (e.g., Ethereum takes approximately ten minutes to add any transaction to the blockchain).
Time/clock should be in sync among the Blockchain nodes as timestamp is part of transaction and used during merging of ledgers.

Holochain overcomes above limitations of blockchain and provides fully distributed peer-to-peer computing. Holochain is also resistant to malicious actors by using digital signatures to provide authenticity and ownership of the data, Hash-chains to provide data integrity and ordering based on the time sequence, and a DHT to provide de-centralized data storage, so that it can be hosted by outside communities from a centralized authority system.

With respect to the DHT, Holochain nodes do not rely on a central coordinator, instead balancing and storing data amongst themselves. Key-value pairs for the. DHT are stored across the nodes in a manner that favors an even distribution across the nodes such that each node had an equal chance of being chosen to store a keys-value pair. Signed source chains are used to ensure the immutability of the data, with validation rules being used to ensure the legitimacy of transactions. These rules, also known as Holochain DNA, define access control and privacy policies (e.g., to control who is allowed to join the network and see its data, control which actions can be taken with respect to the data, etc), and serve to validate the data itself (e.g., to ensure proper formatting, data ranges, etc.).

As noted above, 5G presents an evolution over previous generations, promising broadband connectivity to potentially billions of endpoints in the future. In support of this increased data rate, lower latency, etc., the concept of network slicing has also emerged. Generally speaking, network slicing leverages network function virtualization and software defined network techniques, to divide the resources (e.g., connectivity, computing, and storage) into multiple logical network layers. This slows different applications to be served in parallel, with each application receiving its own suitable layer. Overall, network slicing enables the sharing of resources among multiple tenants, network operators, and/or services in multi-domain deployments.

Typically, a user equipment (UE) device requests one or more network slices when registering with an access and mobility management function (AMF)/mobility management entity (MME), which creates or provides the details of the slice(s), accordingly. This requires that the UE device maintain details about the service and slice requirements (e.g., in terms of bandwidth, latency, processing, resiliency, etc.), so that it can send its request for a slice. In addition, the receiving AMF/MME does not have any knowledge about the history of utilization in each slice requested by the UE device, so it cannot perform capacity planning (e.g., by using an existing slice vs. creating a new one).

Further, an enterprise may subscribe to a software-as-a-service (SaaS) provider and access it across any number of network slices and service providers, but without any mechanism to associate those slices with the SaaS provider across the different service providers. For instance, assume that an enterprise wishes to use certain offerings by the SaaS provider, such as by using OpenDNS™ or other DNS-based security service for all Domain Name System (DNS) transactions, by using a security broker service, by analyzing network performance using a network assurance service, etc. Currently, there is mechanism for the participating 5G entities (e.g., the service providers, SaaS providers, etc.) to share this information with one another and in a manner that respects the privacy of the enterprise.

5G Network Slicing and Resource Orchestration Using Holochain

The techniques introduced herein allow for Holochain transactions to be leveraged in a 5G network, in order to perform certain actions in the network, such as capturing and sharing information across different 5G entities. In some aspects, the techniques herein allow for the capture and sharing of network slice policy and utilization information, thereby allowing an AMF/MME to perform capacity planning whenever a UE device requests a network slice. This allows the AMF/MME to create the relevant network slices and policy instantiation on a per-UE basis. In further aspects, the techniques herein also allow for the sharing of network slicing information across service providers that are associated with a particular SaaS provider. This allow for both the distributed sharing of network resources and services across service providers and SaaS providers, as well as policy-based access control with privacy when communicating between service providers in multi-provider deployments.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Specifically, according to various embodiments, a first entity of a 5G network identifies an action that the first entity would like performed in the 5G network. The first entity of the 5G network sends a signed Holochain transaction indicative of the action to a second entity of the 5G network. The second entity of the 5G network generates a mutually-signed Holochain transaction by signing the signed Holochain transaction. The first entity of the 5G network receives the mutually-signed Holochain transaction from the second entity of the 5G network. The first entity of the 5G network publishes the mutually-signed Holochain transaction to a distributed hash table.

Figure 3:
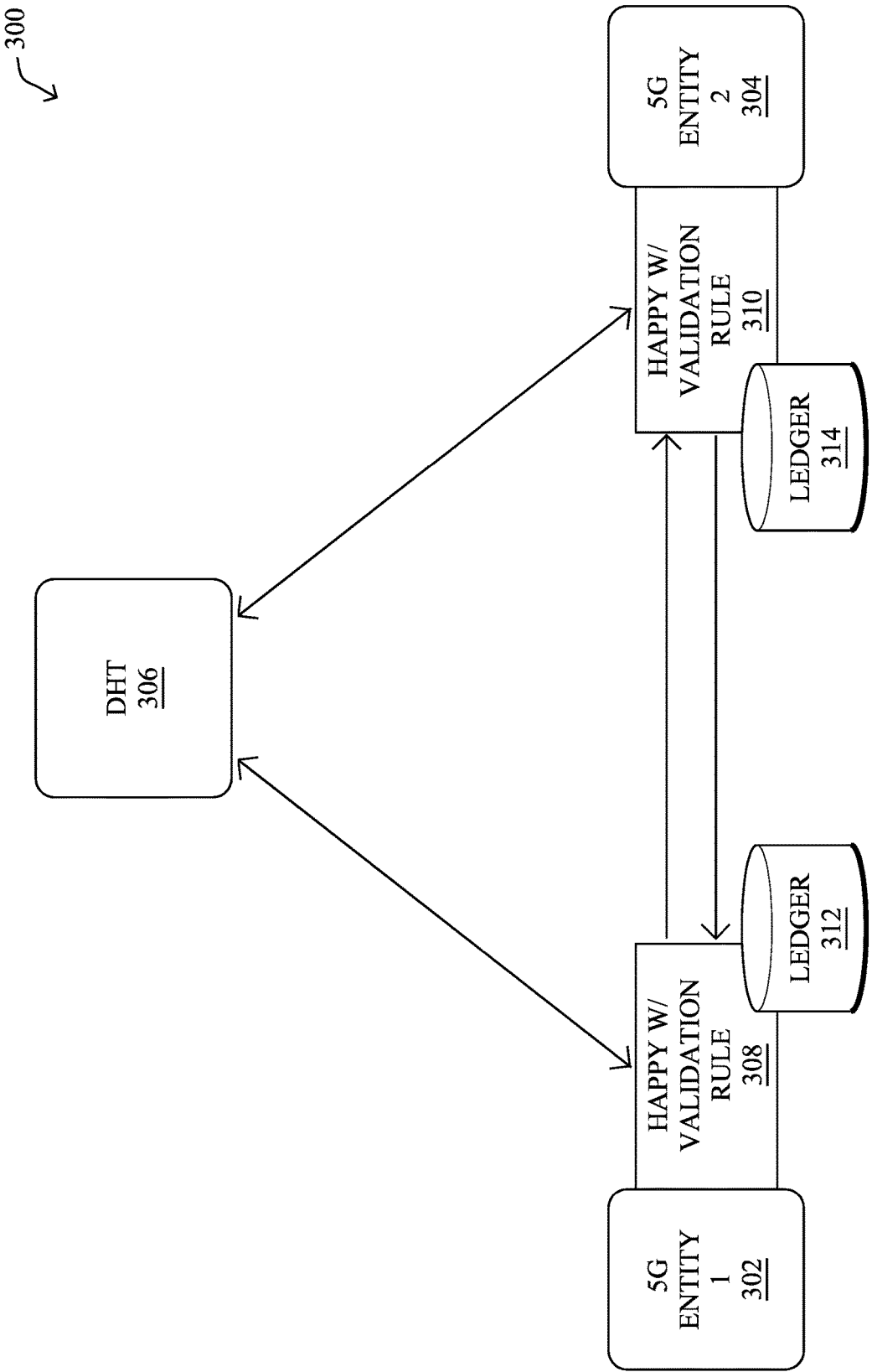
FIG. 3 illustrates an example architecture for 5G entities using Holochain to conduct a transaction.

Operationally, FIG. 3 illustrates an example architecture 300 for 5G entities using Holochain to conduct a transaction, according to various embodiments. As shown, different 5G entities, such as 5G entity 302 and 5G entity 304, may initiate the performance of an action in the 5G network through the use of Holochain transactions. Typically, such an action entails the sharing and storage of information across the different entities, although other actions may also be performed, as desired.

Each of the participating entities may execute its own local Holochain application (Happ) (e.g., as part of, or in conjunction with, communication process 248), which enforces its own validation rule(s) and maintains its own local hashchain ledger. For instance, 5G entity 302 may execute Holochain application 308 that maintains a local ledger 312. Similarly, 5G entity 304 may execute Holochain application 310 that maintains a local ledger 314.

Architecture 300 also includes DHT 306 to which Holochain application 308 and Holochain application 310 write information about any agreed transactions between their respective entities. This allows DHT 306 to be searched for the transaction at a later time. In addition, DHT 306 may confirm the provenance of every transaction, validate the signature of its author, and make sure transactions are committed to their local hash chains/ledgers.

By way of example, assume that 5G entity 302 wishes to share information with 5G entity 304 relating to the 5G network. To do so, 5G entity 302 may instantiate a Holochain transaction that includes the information, sign the transaction, and send the signed transaction to 5G entity 304. On receipt of the signed transaction/information, 5G entity 304 may validate the transaction, by applying its own validation rules to it. If 5G entity 304 cannot validate the transaction, it may discard or ignore it. However, if 5G entity 304 validates the transaction, it may sign the transaction before adding it to its local ledger 314. Once this has occurred, 5G entity 304 may send the now mutually-signed transaction back to 5G entity 302, which likewise add the transaction to its own local ledger 312. After updating their local ledgers 312-314, each of 5G entities 302-304 then publishes the mutually-signed transaction to their shared DHT 306. Since the transaction was mutually signed by 5G entity 302 and 5G entity 304, this effectively makes the published transaction essentially tamperproof.

Architecture 300 allows for various information to be shared across different entities in a 5G network, such as individual (user equipment) UE devices, 5G service providers, SaaS providers, and the like. In doing so, this allows for various functions to be performed in the network such as, but not limited to, the following:

Sharing slice policy and/or slice usage information with an AMF/MME on a per-UE basis, to allow the AMF/MME to perform capacity planning, either by selecting an existing slice or by creating a new one.

Forming a federation between a SaaS provider and multiple 5G service providers, allowing for the sharing of slice information associated with a SaaS provider across different 5G service providers. This allows, for instance, traffic for a particular enterprise to be routed to one or more services of the SaaS provider (e.g., a security service, a traffic analysis service, etc.), regardless of which 5G service provider is providing the network slice for that traffic.

Etc.

Figure 4:
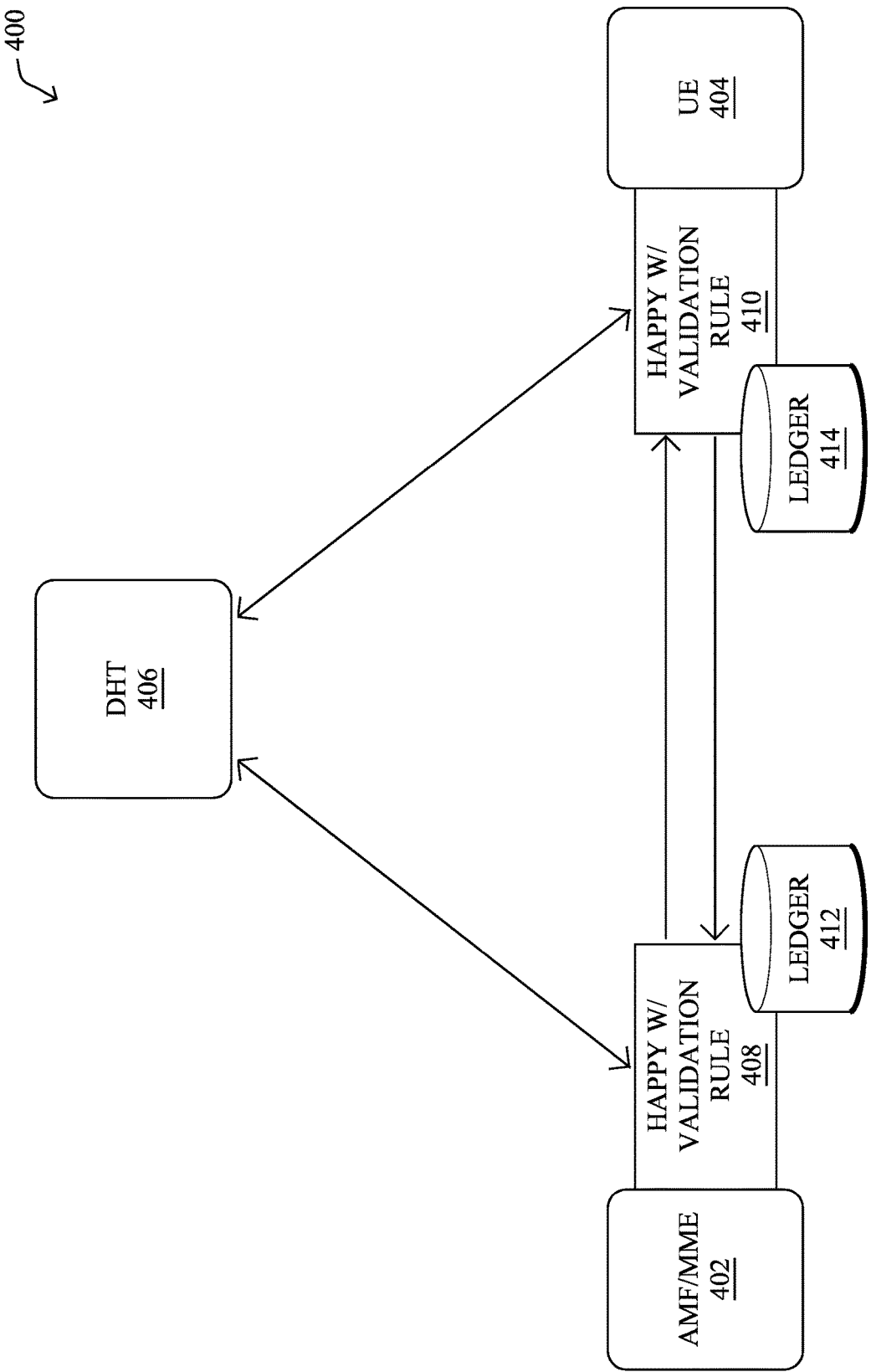
FIG. 4 illustrates an example architecture for user equipment information to be captured and shared in a 5G network using Holochain.

FIG. 4 illustrates an example architecture 400 for user equipment (UE) information to be captured and shared in a 5G network using Holochain, according to various embodiments. In general, architecture 400 may operate in a manner in accordance with the generalized architecture 300 described previously with respect to FIG. 3. Here, assume that architecture 400 includes two 5G entities: an AMF/MME 402 and a UE device 404. Note that while AMF/MME 402 is described herein as its own 5G entity, it may alternatively be viewed as a particular 5G service provider that includes AMF/MME 402. In addition, it is to be appreciated that the AMF terminology used to described AMF/MME 402 is typically used within the 5G literature, while the MME terminology is typically used within the 4G literature, and that both terms are used herein for purposes of completeness.

Similar to FIG. 3, AMF/MME 402 may execute its own Holochain application 408 that maintains a local ledger 412 and applies validation rule(s) to its transactions, while UE device 404 may execute a corresponding Holochain application 410 that maintains a local ledger 414. Each of applications 408-410 may also communicate with a shared DHT 406 that stores information regarding any mutually-signed transactions between AMF/MME 402 and UE device 404.

When UE device 404 registers with AMF/MME 402, it will request the relevant services, per traditional 5G behavior. For instance, UE device 404 may specify its required bandwidth, latency, processing, resiliency, etc. for a network slice. Once AMF/MME 402 has instantiated the network slice(s) and other services for UE device 402, AMF/MME 402 may store the associated information in the Holochain, so that it can be used in the future for purposes of slice assignment and slice allocation. While this approach is explained with AMF/MME 402 as the 5G entity that communicates with DHT 406, a new virtual network function (INF) can also be used for scale purpose.

According to various embodiments, assume that AMF/MME 402 captures slice information for UE device 404 such as any or all of the following:

- UE-ID—an identifier for UE device 404.
- Home PLMN—the home public land mobile network (PLMN) used.
- Network Slice Instance (NSI) information
- Slice utilization history for UE device 404
- Policy information
- Slice requirements (e.g., bandwidth, latency, etc.)
- Etc.

In turn, AMF/MME 402 may initiate storage and sharing of the above information as part of a Holochain transaction. To this end, AMF/MME 402 may include the information in a new Holochain transaction, sign the transaction, and send it to UE device 404. Holochain application 410 of UE device 404 may then validate the transaction, mutually sign the transaction if validated, and add the mutually signed transaction to its local ledger 414. UE device 404 may then return the mutually-signed transaction back to AMF/MME 402. Holochain application 408 then validates the transaction, adds it to ledger 412 of AMF/MME 402 if valid, and publishes the mutually-signed transaction to DHT 406. Similarly, Holochain application 410 may also publish the mutually-signed transaction to DHT 406.

This provides a self-consensus layer for authenticated and secured transaction creation, updating, and exchange. To be more specific: each transaction is created only by the relevant AMF/MME upon registration and is signed by the private key of the AMF/MME. The UE will receive the transaction information only from the registered AMF/MME, or the one that it is registering with, and may validate the transaction using the public key of the AMF/MME. Thus, if UE device 404 cannot validate the transaction from AMF/MME 402, it may discard the transaction information and signal back a refusal to AMF/MME 402. Conversely, if the transaction is validated, it may store the transaction in its local ledger 412. Similarly, if AMF/MME 402 receive a re-registration request from UE device 404, it may compare its UE-ID to that previously stored in the Holochain. If there is a match, AMF/MME 402 may re-register UE device 404 and apply the stored policy to it, perform any capacity planning functions, etc. However, if the supplied UE-ID does not match that stored in the Holochain, AMF/MME 402 may treat the registration as either a traditional UE registration (e.g., a new registration) or mark it as malicious, in various embodiments.

Since the slice/service utilization by UE device 404 may change over time, AMF/MME 402 may periodically update the transaction with the changes. In another embodiment, AMF/MME 402 may create a new transaction whenever there is a substantial change in the details that need to be included and then signal the new details to UE device 404.

Assume now that UE device 404 connects to a new AMF/MME. When it registers with the new AMF/MME, it will send its UE-ID and home PLMN information to the new AMF/MME. In turn, the new AMF/MME can fetch the UE information from DHT 406 and use this information for purposes of capacity planning, network slice and policy instantiation, and/or for any other purpose. For instance, say that UE device 404 requests ultra-reliable, low latency communication (URLLC) and enhanced mobile bradband (eMBB) slices and that its utilization history shows very little utilization on URLCC. In such a case, the AMF/MME may leverage the previously stored information about the UE to decide that an existing URLCC slice could be assigned and that a new eMBB slice should be allocated.

Figure 5A:
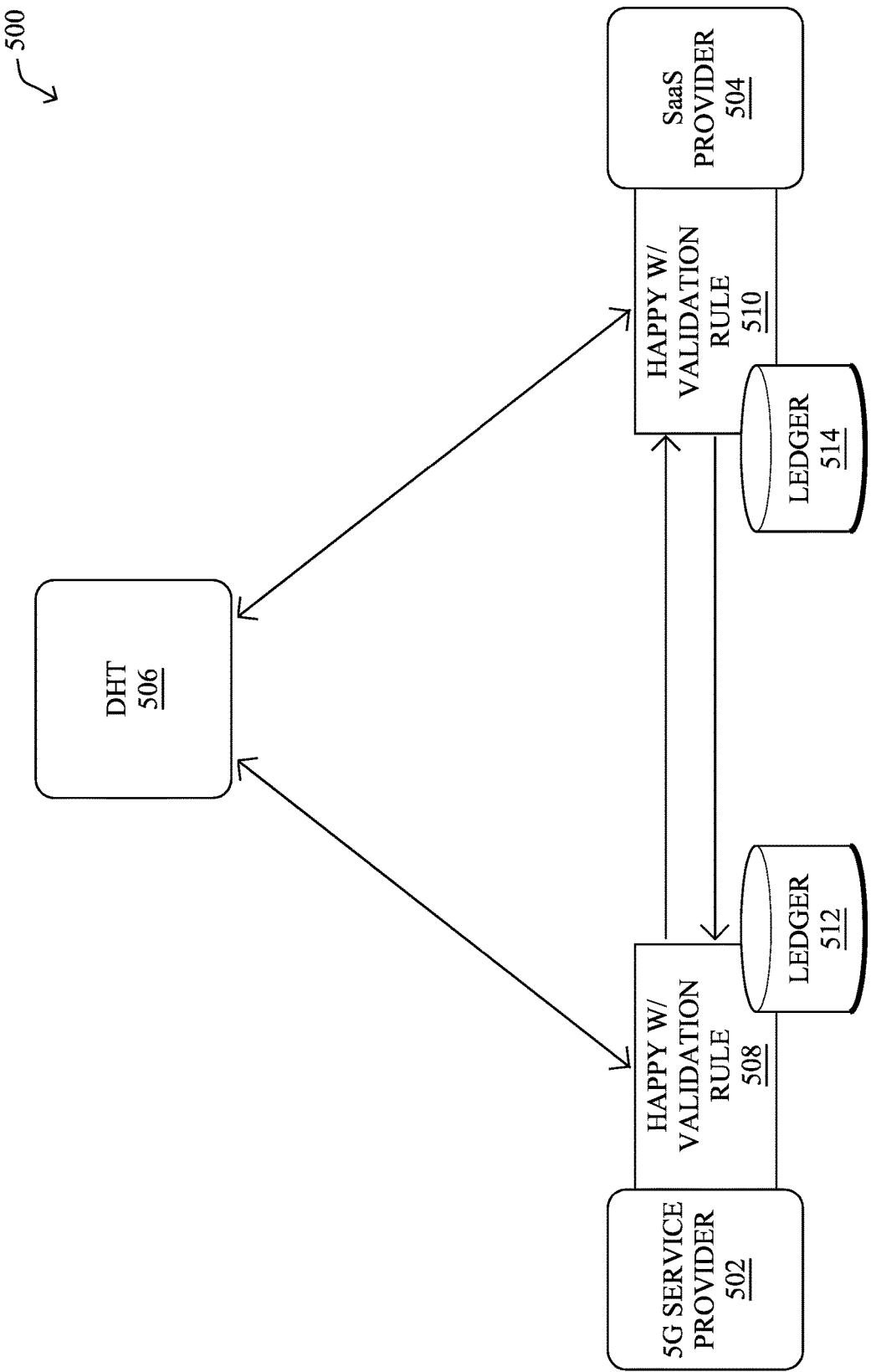
FIGS. 5A-5B illustrate examples of the sharing of network slicing information for a software-as-a-service (SaaS) provider in a 5G network using Holochain.
Figure 5B:
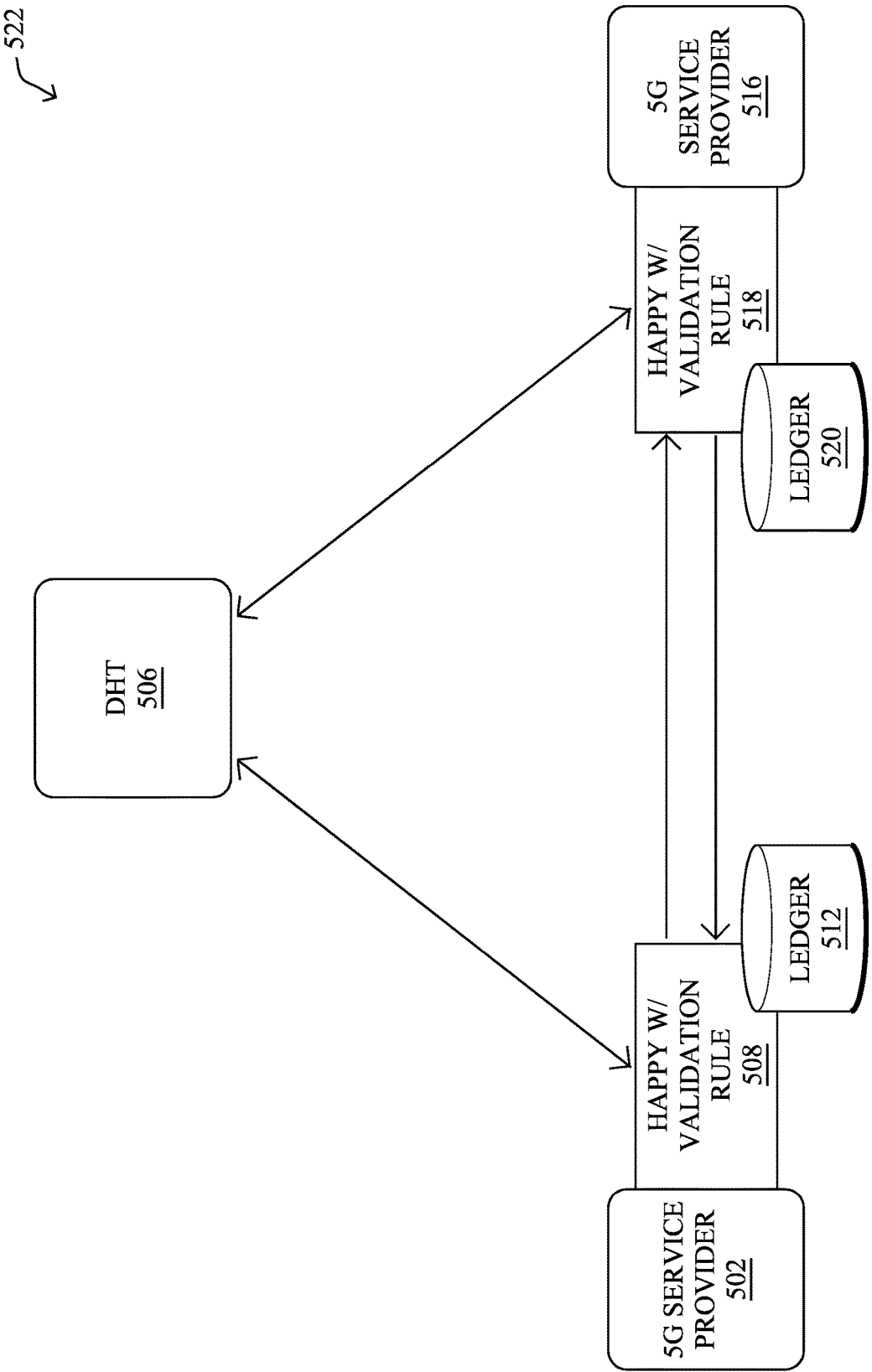

FIGS. 5A-5B illustrate examples of the sharing of network slicing information for a software-as-a-service (SaaS) provider in a 5G network using Holochain, according to various embodiments. As shown in FIG. 5A, again assume that there are two 5G entities: a 5G service provider 502 and an SaaS provider 504, each of which represents a specific device of that entity that is configured to participate in a Holochain transaction. To this end, 5G service provider 502 may execute its own Holochain application 508 that maintains a local ledger 512 and applies validation rule(s) to its transactions, while SaaS provider 504 may execute a corresponding Holochain application 510 that maintains a local ledger 514. Each of applications 508-510 may also communicate with a shared DHT 506 that stores information regarding any mutually-signed transactions between their corresponding entities.

Here, the intended action in the 5G network may be to capture and share information about the slices and policies associated with the application(s) served by SaaS provider 504 for a particular enterprise/subscriber. This allows the information to be shared across 5G service providers in a secure manner that respects General Data Protection Regulation (GDPR) and other privacy-focused requirements.

In various embodiments, assume that 5G service provider 502 wants to exchange network slice and policy information with SaaS provider 504. To do so, 5G service provider 502 may initiate a new Holochain transaction, sign the transaction using its private key, and send the signed transaction to SaaS provider 504. SaaS provider 504 may then validate the transaction using the public key of 5G service provider 502, form a mutually-signed transaction by signing the transaction with its own private key, and store the mutually-signed transaction in its ledger 514. SaaS provider 504 may then provide the mutually-signed transaction back to 5G service provider 502, which validates the signature of SaaS provider 504 using the public key of SaaS provider 504 and add the transaction to its ledger 512. 5G service provider 502 and SaaS provider 504 may then each publish the mutually-signed transaction to DHT 506.

FIG. 5B illustrates another example architecture 522 in which 5G service provider 502 is able to exchange network slice and policy information with another 5G service provider 516 using Holochain. To this end, 5G service provider 516 may execute its own Holochain application 518 that maintains a local ledger 520. Similar to the previous examples, 5G service provider 502 and 5G service provider 516 may include the information in a Holochain transaction, thereby allowing different 5G service providers to exchange slice and policy information associated with a particular SaaS provider (e.g., its SaaS provider 504) and/or subscribing enterprise. For instance, 5G service provider 502 may include the information in a transaction, sign it, and send the signed transaction to 5G service provider 516. 5G service provider 516 may then validate the transaction, sign it using its own key, store the mutually-signed transaction in its ledger 520, send the mutually-signed transaction back to 5G service provider 502, and publish the transaction to DHT 506. Likewise, 5G service provider 502 may validate the mutually-signed transaction, store it in its local ledger 512, and publish the mutually-signed transaction to DHT 506.

Thus, in various embodiments, architecture 500 and architecture 522 provide a framework whereby different 5G entities such as different 5G service providers, SaaS providers, etc. can exchange network slice and policy information in a secure manner that protect the privacy of the shared information. For instance, say an enterprise that uses network slices from both 5G service provider 502 and 5G service provider 516 that are associated with SaaS provider 504. The framework herein allows the sharing of information about the associated slices, allowing for the coordinated deployment of the SaaS services and mapping those services to the network slices of the different service providers, in a secure and privacy-protecting manner.

Figure 6:
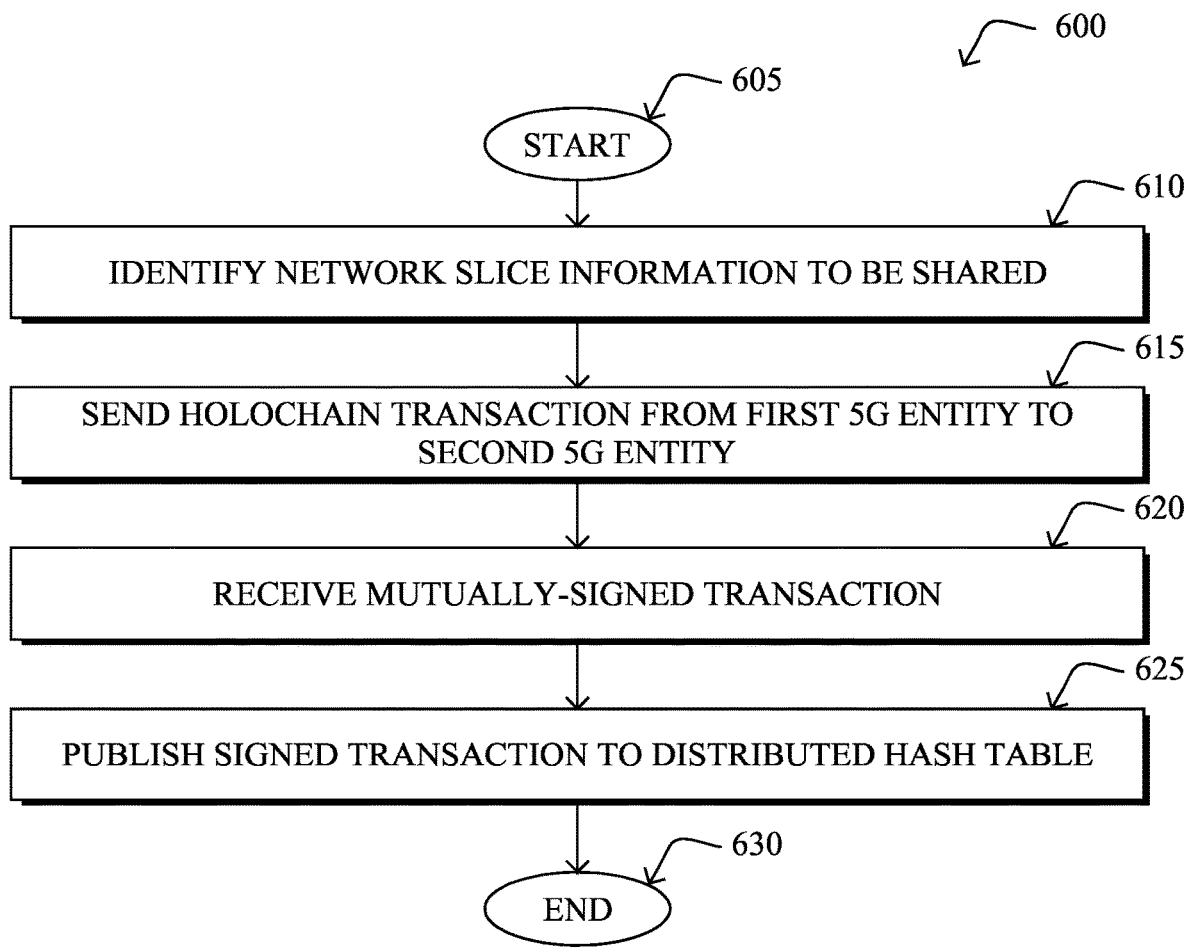
FIG. 6 illustrates an example simplified procedure for a 5G entity effecting performance of an action in a 5G network using Holochain.

FIG. 6 illustrates an example simplified procedure for a 5G entity effecting performance of an action in a 5G network using Holochain, in accordance with one or more embodiments described herein. The procedure 600 may start at step 605, and continues to step 610, where, as described in greater detail above, a first entity of a 5G network, such as a device of a 5G service provider, an SaaS provider, an AMF/MME, or the like, may identify network slice information to be shared in the 5G network. For instance, this information may indicate the policies, utilization information, associated SaaS provider, etc. for a particular network slice, that can be shared with another entity of the 5G network.

At step 615, as detailed above, the first entity may send a signed Holochain transaction indicative of the action to a second entity of the 5G network. In various embodiments, the transaction may include the slice information that the first entity wishes to share, such as sharing network slice information associated with a SaaS provider with another 5G service provider, sharing policy and network slice utilization information for user equipment, or the like. In response to the signed transaction, the second entity may generate a mutually-signed transaction by signing the sent Holochain transaction.

At step 620, the first entity may receive the mutually-signed Holochain transaction from the second entity, as described in greater detail above. In some embodiments, the first entity may then validate the mutually-signed transaction using a public key of the second entity and, if validated, store the transaction in a local hashchain ledger of the first entity.

At step 625, as detailed above, the first entity may publish the mutually-signed Holochain transaction to a distributed hash table (DHT). This allows the transaction, as well as any information captured in the transaction, to be shared with other 5G entities. For instance, in the case of the first entity being an AMF and the transaction including slice information for a UE device, publication of the transaction allows another AMF to retrieve this information, such as when the UE device attempts to register with the other AMF. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for 5G network slicing and orchestration using Holochain, it is to be understood that various other adaptations and modifications may be made within the intent and scope of the embodiments herein. For example, while the techniques herein are described with respect to certain types of networks, the techniques herein are not limited as such and can be used in any other form of wireless network, as desired. Further, while certain protocols are used herein for illustrative purposes, the techniques herein can also be implemented using other suitable protocols, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
   identifying, by a first entity of a 5G network, network slice information to be shared in the 5G network, wherein the network slice information is associated with a software-as-a-service provider and comprises policy information or network slice utilization information for a user equipment device;
   sending, by the first entity of the 5G network, a signed Holochain transaction indicative of the network slice information to a second entity of the 5G network, wherein the second entity of the 5G network generates a mutually-signed Holochain transaction by signing the signed Holochain transaction;
   receiving and validating, at the first entity of the 5G network, the mutually-signed Holochain transaction from the second entity of the 5G network, with hash-chains before publishing the mutually-signed Holochain transaction with a distributed hash table; and
   publishing, by the first entity of the 5G network, the received and validated mutually-signed Holochain transaction to the distributed hash table by utilizing cryptographic hashes.

2. The method as in claim 1, further comprising:
   adding the mutually-signed Holochain transaction to a local hashchain of the first entity of the 5G network.

3. The method as in claim 1, wherein the first entity of the 5G network comprises a first 5G service provider.

4. The method as in claim 3, wherein the second entity of the 5G network comprises a second 5G service provider with which the network slice information is being shared.

5. The method as in claim 4, wherein the second 5G service provider uses network slice information associated with the software-as-a-service provider and shared by the first 5G service provider to route traffic to the software-as-a-service provider.

6. The method as in claim 3, wherein the second entity of the 5G network comprises the software-as-a-service provider.

7. The method as in claim 1, wherein the first entity of the 5G network comprises an access and mobility management function (AMF).

8. The method as in claim 7, wherein the second entity of the 5G network comprises the user equipment device.

9. The method as in claim 7, wherein a second AMF retrieves the network slice information for the user equipment device from the distributed hash table, in response to the user equipment device connecting to the second AMF.

10. The method as in claim 1, wherein the second entity of the 5G network also publishes the mutually-signed Holochain transaction to the distributed hash table.

11. An apparatus, comprising:
one or more network interfaces;
a processor coupled to the one or more network interfaces and configured to execute one or more processes; and
a memory configured to store a process that is executable by the processor, the process when executed configured to:
identify, by a first entity of a 5G network, network slice information to be shared in the 5G network wherein the network slice information is associated with a software-as-a-service provider and comprises policy information or network slice utilization information for a user equipment device;
send, by the first entity of the 5G network, a signed Holochain transaction indicative of the network slice information to a second entity of the 5G network, wherein the second entity of the 5G network generates a mutually-signed Holochain transaction by signing the signed Holochain transaction;
receive and validate, at the first entity of the 5G network, the mutually-signed Holochain transaction from the second entity of the 5G network, with hash-chains before publishing the mutuallv-signed Holochain transaction on a distributed hash table; and
publish, by the first entity of the 5G network, the received and validated mutually-signed Holochain transaction to the distributed hash table by utilizinci cryptographic hashes.

12. The apparatus as in claim 11, wherein the process when executed is further configured to:
adding the mutually-signed Holochain transaction to a local hashchain of the apparatus.

13. The apparatus as in claim 11, wherein the apparatus is part of a first 5G service provider.

14. The apparatus as in claim 13, wherein the second entity of the 5G network comprises a second 5G service provider with which the network slice information is being shared.

15. The apparatus as in claim 14, wherein the second 5G service provider uses network slice information associated with the software-as-a-service provider and shared by the first 5G service provider to route traffic to the software-as-a-service provider.

16. The apparatus as in claim 13, wherein the second entity of the 5G network comprises the software-as-a-service provider.

17. The apparatus as in claim 11, wherein the first entity of the 5G network comprises an access and mobility management function (AMF).

18. The apparatus as in claim 17, wherein the second entity of the 5G network comprises the user equipment device.

19. The apparatus as in claim 17, wherein a second AMF retrieves the network slice information for the user equipment device from the distributed hash table, in response to the user equipment device connecting to the second AMF.

20. A tangible, non-transitory, computer-readable medium storing program instructions that cause a first entity of a 5G network to execute a process comprising:
identifying, by a first entity of a 5G network, network slice information to be shared in the 5G network, wherein the network slice information is associated with a software-as-a-service provider and comprises policy information or network slice utilization information for a user equipment device;
sending, by the first entity of the 5G network, a signed Holochain transaction indicative of the network slice information to a second entity of the 5G network, wherein the second entity of the 5G network generates a mutually-signed Holochain transaction by signing the signed Holochain transaction;
receiving and validating, at the first entity of the 5G network, the mutually-signed Holochain transaction from the second entity of the 5G network, with hash-chains before publishing the mutually-signed Holochain transaction on a distributed hash table; and
publishing, by the first entity of the 5G network, the received and validated mutually-signed Holochain transaction to the distributed hash table by utilizing cryptographic hashes.

\* \* \* \* \*

UNITED STATES PATENT AND TRADEMARK OFFICE
CERTIFICATE OF CORRECTION

| | |
|---|---|
| PATENT NO. | : 11,838,854 B2 |
| APPLICATION NO. | : 17/367710 |
| DATED | : December 5, 2023 |
| INVENTOR(S) | : Niranjan M M et al. |

It is certified that error appears in the above-identified patent and that said Letters Patent is hereby corrected as shown below:

In the Specification

Column 8, Line 11 please amend as shown:
equal chance of being chosen to store a key-value pair.

Column 10, Line 67 please amend as shown:
(VNF) can also be used for scale purpose.

Column 15, Line 28 please amend as shown:
the distributed hash table by utilizing cryptographic Signed and Sealed this
Twenty-seventh Day of February, 2024

Katherine Kelly Vidal
*Director of the United States Patent and Trademark Office*